(12) United States Patent
Rickabaugh

(10) Patent No.: US 9,107,530 B1
(45) Date of Patent: Aug. 18, 2015

(54) FOOD STORAGE BOWL WITH STRAINER

(71) Applicant: Troy E. Rickabaugh, Temple, TX (US)

(72) Inventor: Troy E. Rickabaugh, Temple, TX (US)

( * ) Notice: Subject to any disclaimer, the term of this patent is extended or adjusted under 35 U.S.C. 154(b) by 134 days.

(21) Appl. No.: 13/838,052

(22) Filed: Mar. 15, 2013

(51) Int. Cl.
*A47J 19/00* (2006.01)

(52) U.S. Cl.
CPC ..................... *A47J 19/005* (2013.01)

(58) Field of Classification Search
CPC .............................. B65B 7/2857; A47J 19/005
USPC .......................................................... 210/499
See application file for complete search history.

(56) References Cited

U.S. PATENT DOCUMENTS

| | | | | |
|---|---|---|---|---|
| 4,416,248 A | * | 11/1983 | Schlosser | 126/9 B |
| 4,505,226 A | * | 3/1985 | Carlson | 119/166 |
| 4,603,679 A | * | 8/1986 | Ogden | 126/25 B |
| 5,930,847 A | * | 8/1999 | Hall | 4/300.3 |
| 7,878,110 B1 | | 2/2011 | Michnik et al. | |
| 8,016,122 B2 | | 9/2011 | Coudurier et al. | |
| 2012/0210943 A1 | * | 8/2012 | Omps | 119/166 |
| 2013/0092566 A1 | * | 4/2013 | Zabinski et al. | 206/216 |

* cited by examiner

*Primary Examiner* — Chester Barry
(74) *Attorney, Agent, or Firm* — Robert C. Montgomery; Montgomery Patent & Design, LP.

(57) ABSTRACT

A food serving bowl with integrated straining capabilities is provided with a securable lid. A lower surface of the bowl is provided with a rotating cover, thereby exposing a plurality of holes allowing any liquid contained within the bowl to be strained out. A bottom section of the bowl is divided into triangular sections. In an alternating manner a first plurality of sections are provided with holes while a second plurality of sections are not. The movable cover obstructs the open holes when in a closed position, thereby allowing the device to function as a conventional bowl. These features allow the device to serve both roles as a straining container as well as a food mixing or serving bowl.

16 Claims, 4 Drawing Sheets

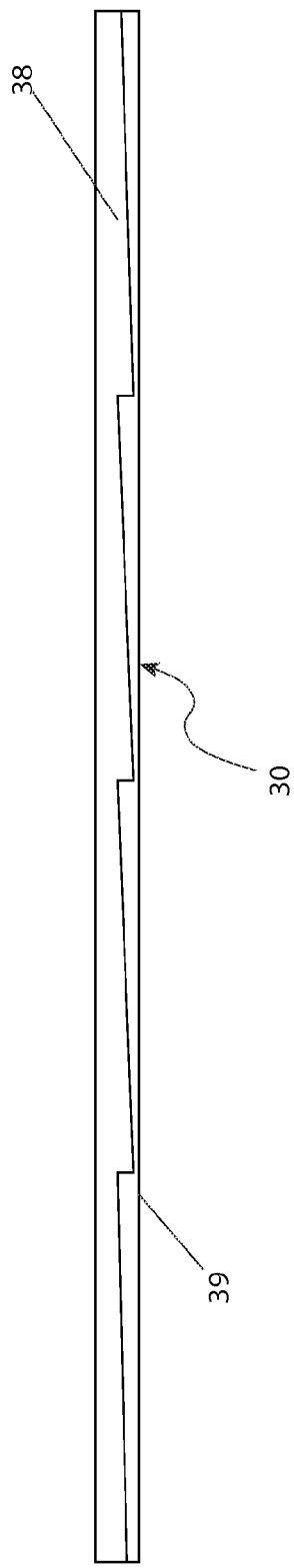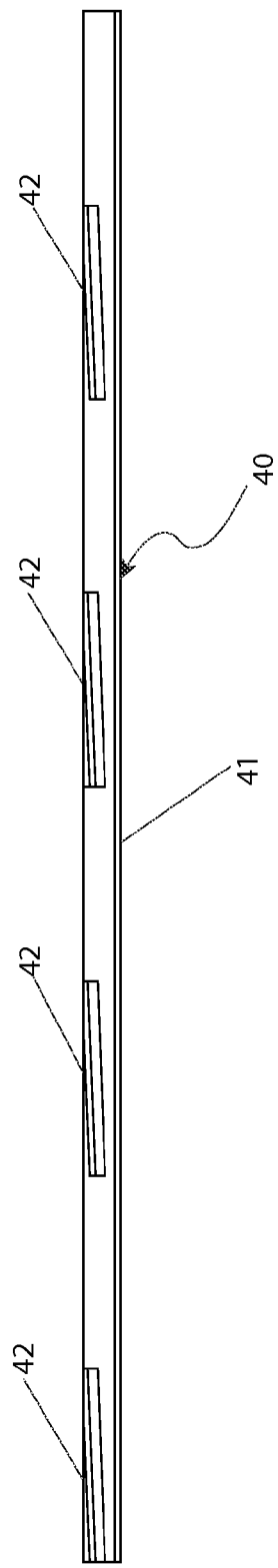

FOOD STORAGE BOWL WITH STRAINER

RELATED APPLICATIONS

Not applicable.

FIELD OF THE INVENTION

The present invention relates generally to a bowl having a strainer operably connected to an exterior apron such that the strainer is selectively movable between an open position to drain collected liquid within the bowl and a closed position.

BACKGROUND OF THE INVENTION

Developing better devices and methods to preserve and store food has been a sinew of technological advancement since the dawn of mankind. Without the ability to preserve and store food for later use, mankind would spend much of his day hunting, gathering, and preparing food. As mankind becomes more technologically advanced we demand of ourselves to do more, or at least have the ability to do more, in a given day. We not only want to do more but experience more as well. We want to increase our utility, but we also want to increase our artistic expression and sophistication. We no longer want to merely save food to eat it later, but we want to preserve and store it in a more sophisticated manner so that we can enjoy the complexity and culinary craftsmanship with which the food was prepared.

Sealing prepared food within air-tight containers as a method to store and preserve it for later use is well known. Limiting exposure of bacteria-laden food to fresh air and moisture impedes the food spoilage process. Limited supplies of air and moisture also inhibit enzyme activation as well as mold and yeast growth. Prior art in this field consists of containers with removable lids that are specifically configured to create air-tight seals. Some containers also limit the amount of certain wavelengths of light from entering the container to further inhibit the spoilage process. Nonetheless, prior art in this field fails to store foodstuff in a manner more conducive to preserving the food for a better tasting experience in addition to preserving the food for later use. It is desirous to have a food storage container that would facilitate this. Some prepared foods tend to either seep moisture while at rest for extended periods or act as a substrate for water condensation due to temperature differentials. In either case, the food sits in moisture when placed into a storage container, which degrades the taste and texture of the food. It would be beneficial to have a storage container equipped with a strainer to obviate such occurrences.

SUMMARY OF THE INVENTION

The present invention describes a food storage bowl with strainer to drain liquid from food stuffs contained within the bowl, or alternatively convert the strainer base to a solid structure to retain liquids. The device comprises of a bowl, a lid, and a strainer base. The lid further comprises of a lid lip of a size and configuration to fit over a perimeter edge of the bowl and form an air-tight seal. The bowl bottom is divided into triangular sections, and, in an alternating manner, some sections are provided with a plurality of apertures while some sections are not. A base of the strainer is divided into triangular sections with an aperture configuration similar to the bowl bottom configuration. The bowl is further equipped with an apron, a groove, a plurality of fingers, a ramp section, and gussets. The configuration of these components allow for the bowl to be converted to and from a strainer. When in a non-strainer configuration, a bowl region is formed that is closed off from a strainer region so as to prevent drained liquids from infiltrating the bowl region where foodstuff is placed. When in a strainer configuration, the bottom of the bowl region is provided with a plurality of apertures leading into a strainer region to allow water to be strained from foodstuff placed in the bowl region. The device is converted to and from a strainer configuration by turning the strainer base in clockwise and counter-clockwise rotations.

Modern society demands quick access to prepared foods. It is an object of this invention to provide a device that not only stores and preserves prepared food in a container, but also strains unwanted moisture from the food container. It is a further object of this invention to afford the ability to strain the unwanted water at any time and at the discretion of the user. Water build up tends to occur after the food has been prepared and placed in storage. It is beneficial to have the ability to remove such water without having to transfer the food from its original storage container. The development of the present invention fulfills that need.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 4a is a projected view of the groove 39 in the apron 38 of the apparatus 10 in accordance to the preferred embodiment of the present invention; and, FIG. 4b is a projected view of the fingers 42 in the strainer base 40 of the apparatus 10 in accordance to the preferred embodiment of the present invention.

Figure 1:
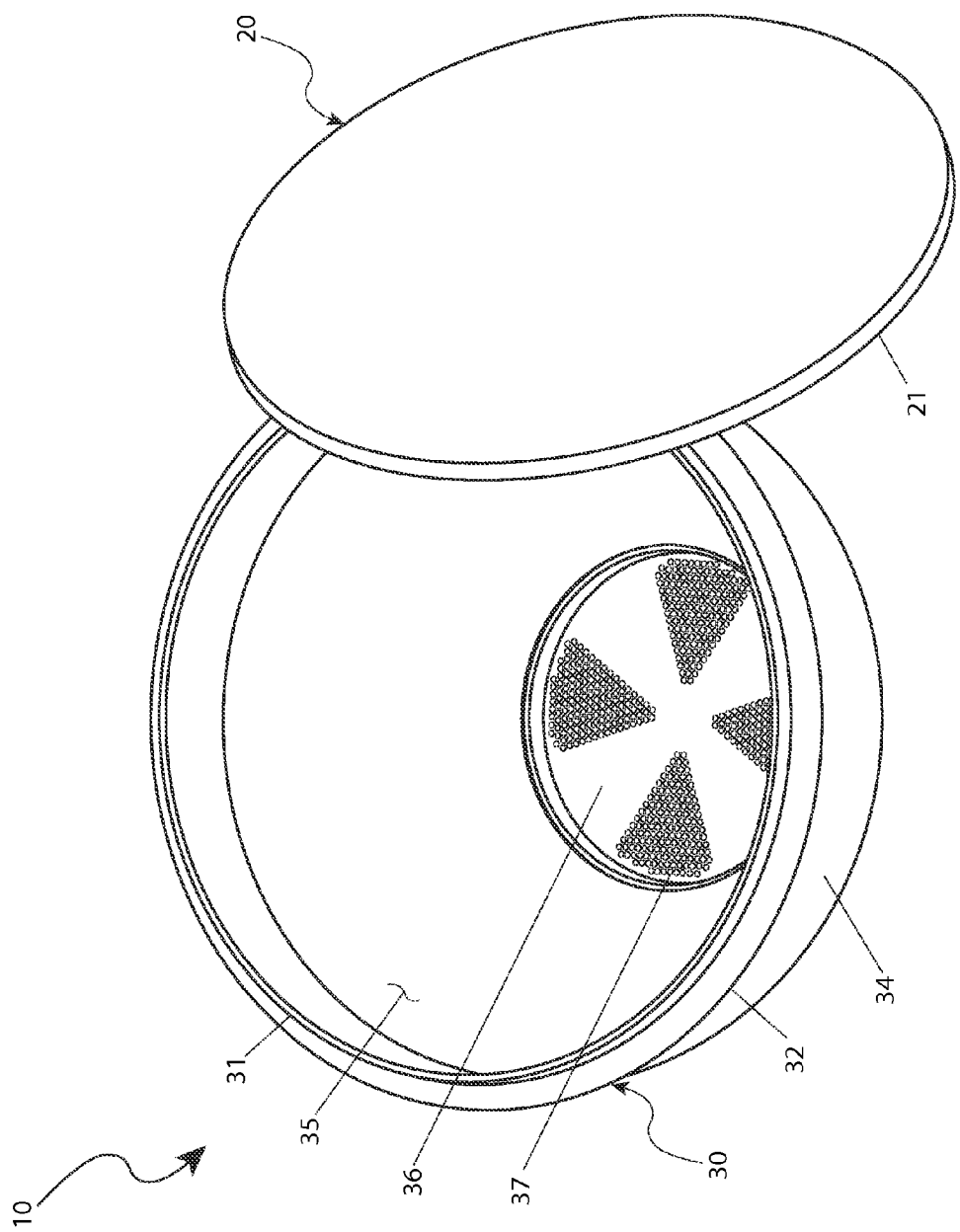
FIG. 1 is a top perspective view of a food storage bowl with strainer 10 and lid 20 in accordance to the preferred embodiment of the present invention.

DESCRIPTIVE KEY 10 food storage bowl with strainer
20 lid
21 lid lip
22 bead
30 bowl
31 bowl lip
32 flange
33 gusset
34 sidewall
35 bowl interior
36 bowl bottom
37 bowl aperture
38 apron
39 groove
40 strainer base
41 base bottom
42 finger
43 strainer aperture 44 stiffener

DETAILED DESCRIPTION OF THE PREFERRED EMBODIMENT

In accordance with the invention, the best mode is presented in terms of the described embodiments, herein depicted within FIGS. 1 through 4B. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only certain configurations have been shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the"" are intended to include the plural forms as well, unless the context clearly indicates otherwise. It also will be understood that, as used herein, the term "comprising" or "comprises" is open-ended, and includes one (1) or more stated elements, steps or functions without precluding one (1) or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

The present invention describes a food storage bowl with strainer (herein referred to as the "apparatus") 10, which provides a means to alternately drain any liquid from foodstuffs contained within the bowl 30, or partially turn the strainer base 40 and block off the strainer to retain liquids. While this invention was originally conceived to function relative to the preparation and storage of foodstuffs, it is understood that a container with the stated capabilities can find broader applications without limiting the scope of this invention.

Referring now to FIG. 1, a perspective view of the apparatus 10 and lid 20, in accordance to the preferred embodiment of the present invention, is disclosed. The bowl 30, the lid 20, and the strainer base are comprised preferably of molded, high density polyethylene. The apparatus 10 can be configured in a variety of sizes, colors, and shapes so long as the apron 38 of the bowl 30 and the strainer base 40 are the requisite round shape to permit relative rotation. The lid 20 would be molded with a lid lip 21 of a size to fit over the bowl lip 31 with a slight interference fit to achieve a seal. The seal could alternately be improved by angling the lid lip 21 to less than ninety degrees (90°) or by adding a bead 22 to the inside of the lid lip 21.

A flange 32 is disposed around the top of the bowl 30 just below the bowl lip 31. The purpose of the flange 32 is to add structural rigidity to the sidewall 34 and provide control in handling the apparatus 10 during transportation. Portions of the flange 32 could alternately be extended to form handles, which would provide further control in the handling of the apparatus 10 during transportation and still remain within the scope of this invention. A plurality of gussets 33 is disposed under the flange 32 to provide additional structural rigidity to the bowl 30. The gussets 33 may be distributed uniformly, or situated in some alternate symmetrical pattern.

The bowl 30 includes a bowl bottom 36 and sidewall 34 which define a hollow interior 35. The bowl bottom 36 is divided into triangular sections. In an alternating manner a first plurality of sections are provided with a plurality of bowl apertures 37 while a second plurality of sections are not.

Figure 2:
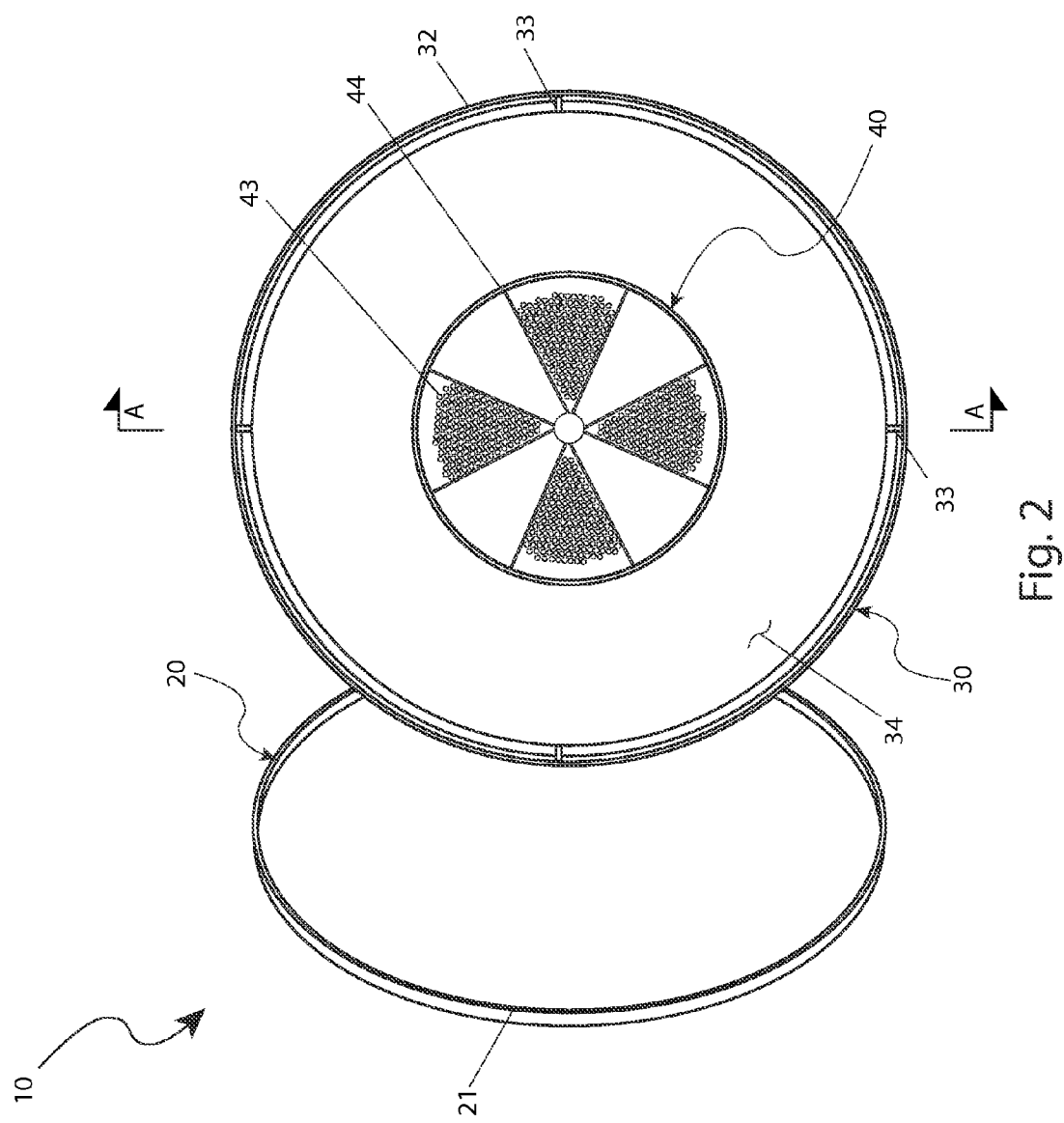
FIG. 2 is a bottom view of the food storage bowl with strainer 10 in accordance to the preferred embodiment of the present invention.
Figure 3:
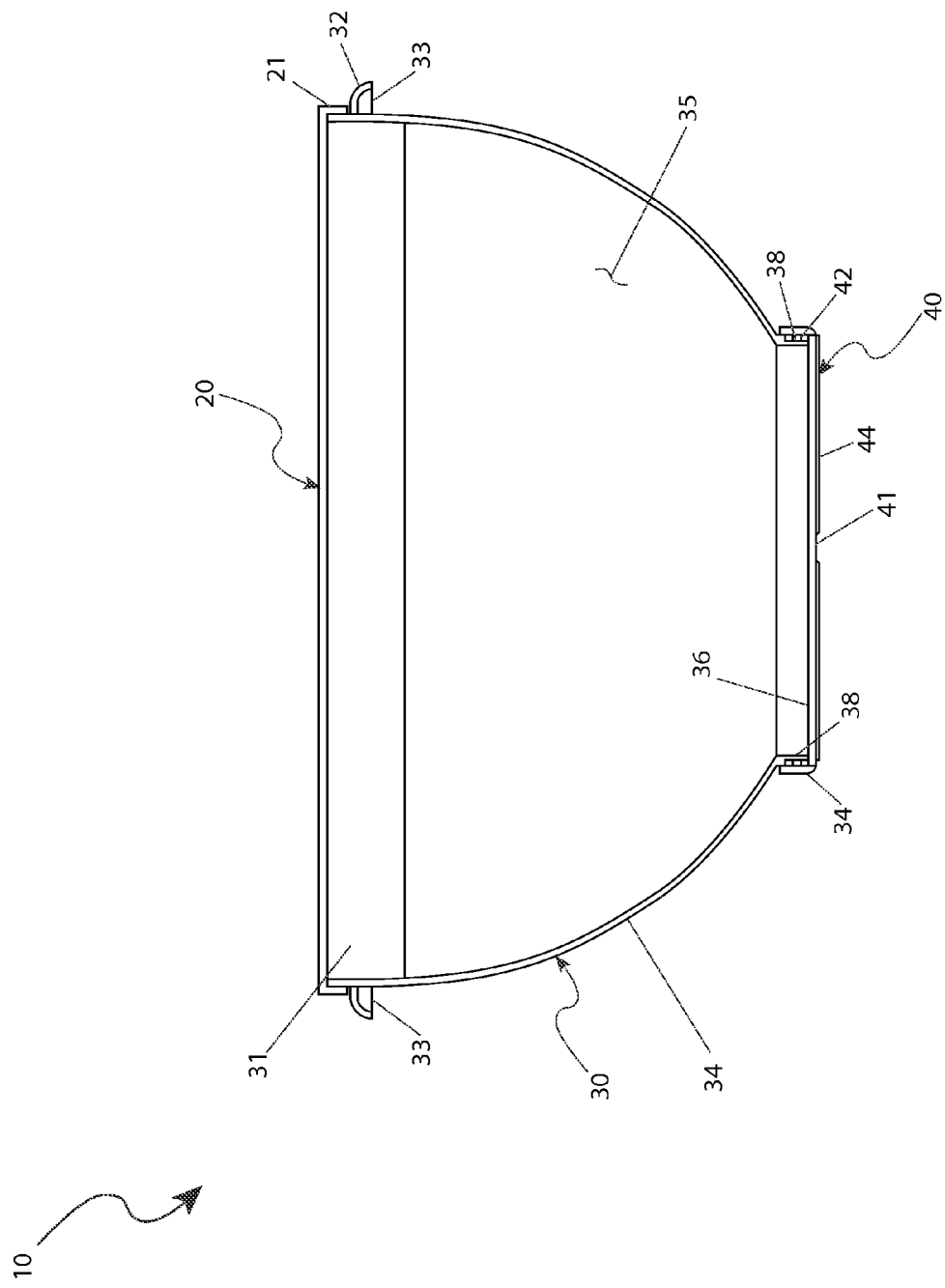
FIG. 3 is a section view along line A-A of the food storage bowl with strainer 10 and lid 20 in accordance to the preferred embodiment of the present invention.

Referring now to FIG. 2, a bottom view of the apparatus 10, and FIG. 3, a section view along line A-A of said apparatus 10, in accordance to the preferred embodiment of the present invention, is presented. Disposed on the bottom of the bowl 30 is an apron 38 comprised of a round piece of high density polyethylene into which a specific groove 39 has been formed. The pattern of this groove 39 is a series of alternating flats and ramps as seen in FIG. 4a. The strainer base 40, as seen in FIG. 3, has a series of fingers 42 formed on the interior of the vertical wall of said strainer base 40. The strainer base 40 is essentially an inverted lid with the fingers 42 being an internal thread. The strainer base 40 is pressed onto the apron 38 such that the fingers 42 of said strainer base 40 correspondingly mate with the groove 39 in said apron 38 and align with the flat sections of said groove 39. The base bottom 41 of the strainer base 40 is divided into triangular sections. Similar to the bowl bottom 36, the strainer base bottom 41 has a first plurality of sections provided with a plurality of strainer apertures 43 alternating with a second plurality of sections without strainer apertures 43. When the fingers 42 in the strainer base 40 are aligned with the flats in the groove 39 in the apron 38 of the bowl 30, the strainer apertures 43 in said strainer base 40 are in alignment with the bowl apertures 37 in the bowl bottom 36 and liquid will drain out of the bowl 30. When the strainer base 40 is rotated in a counter clockwise direction, as viewed from the top of the apparatus 10, the fingers 42 of said strainer bottom 40 begin to travel up the ramp section of the groove 39 in the apron 38 of the bowl 30, changing the alignment of the strainer apertures 43 in said strainer bottom 40 with the bowl apertures 37 in the bowl bottom 36, and bringing the base bottom 41 into closer proximity to the bowl bottom 36. When the fingers 42 of the strainer base 40 are completely engaged with the ramp section of the groove 39 in the apron 38 of the bowl 30, the alternating sections of strainer apertures 43 in the strainer base 40 is aligned with the sections of the bowl bottom 36 without bowl apertures 37, and the base bottom 41 of said strainer base 40 is in contact with the bowl bottom 36, sealing off the bowl interior 35. The outer edge of the strainer base 40 could have a knurled or scalloped pattern to improve the grip and facilitate the turning of said strainer base 40 relative to the bowl 30 of the apparatus 10. Stiffeners 44, comprised of welts of high density polyethylene material, are radially disposed on the base bottom 41 of the strainer base 40 to provide additional rigidity to said strainer bottom 40.

The preferred embodiment of the present invention can be utilized by the common user in a simple and straight forward manner with little or no training. The method of utilizing the apparatus 10 may be achieved by performing the following steps: acquiring a model of the apparatus 10 having the desired color and style to suit the taste of the user; removing the lid 20 from the apparatus 10 and preliminarily cleansing said apparatus 10 with soap and warm water prior to the initial use; turning the strainer base 40 in a clockwise direction, as viewed from the top of the apparatus 10, thus unsealing the bowl interior 55 and aligning the strainer apertures 43 in the strainer base 40 with the bowl apertures 37 in the bowl bottom 36; placing the cooked food with liquid into the bowl 30; allowing the liquid to drain; turning the strainer base 40 in a counter clockwise direction, as viewed from the top of the apparatus 10, thus sealing the bowl interior 55 and aligning the strainer apertures 43 in the strainer base 40 with the sections of the bowl bottom 36 without bowl apertures 37; placing the lid 20 onto the bowl 30; and refrigerating any leftovers.

The foregoing embodiments of the disclosed weighted backpack have been presented for purposes of illustration and description. They are not intended to be exhaustive or to limit the invention and method of use to the precise forms disclosed. It can be appreciated by one skilled in the art that other styles, configurations, and modifications of the invention can be incorporated into the teachings of the present disclosure upon reading the specification and that the embodiments of the disclosed baluster bracket assembly shown and described are for the purposes of clarity and disclosure and to limit the scope. The embodiments have been chosen and described in order to best explain the principles and practical application in accordance with the invention to enable those skilled in the art to best utilize the various embodiments with expected modifications as are suited to the particular use contemplated. The present application includes such modifications and is limited only by the scope of the claims.

What is claimed is:

1. A bowl, comprising:
   a bowl body, comprising a bowl sidewall and a bowl bottom defining an interior and further comprising:
      a first lip around an upper perimeter edge of said bowl body;
      a flange circumscribing an outer surface of said bowl subjacent to said lip;
      an apron disposed along an outer circumference of said bowl bottom, comprising a groove on an inner surface thereof, said groove comprising a series of alternating flat portions and ramp portions;
      a strainer residing within said apron and in fluid communication with said bowl bottom, said strainer operably connected to said apron; and,
   a lid having a second lip removably attachable to said first lip;
   wherein said bowl bottom comprises a recessed portion having a circular cross-section depending downward from a bottom of said bowl sidewall, further comprising:
      a first plurality of sections each provided with a plurality of bowl apertures; and,
      a second plurality of sections;
      wherein individual sections of said first plurality of sections alternate with individual sections of said second plurality of sections;
   wherein said flange provides structural rigidity to said bowl body;
   wherein said strainer is movable between a closed position and an open position; and,
   wherein said open position enables collected liquids in a bottom of said bowl to drain away.

2. The bowl of claim 1, wherein said strainer further comprises:
   a strainer base, comprising a series of fingers formed on an interior vertical wall thereof said strainer base;
   a strainer base bottom, comprising a third plurality of sections each having a plurality of strainer apertures and a fourth plurality of sections; and,
   a plurality of stiffeners radially disposed on said strainer base bottom;
   wherein said series of fingers are in mechanical communication with said groove;
   wherein individual sections of said third plurality of sections alternate with individual sections of said fourth plurality of sections;
   wherein when said series of fingers are aligned with said flat portions, said plurality of strainer apertures of said first plurality of sections are in fluid communication with said plurality of bowl apertures of said third plurality of sections to achieve said open position; and,
   wherein when said series of fingers are fully aligned within said ramp portions, said second plurality of sections are aligned with said fourth plurality of sections and said strainer base bottom abuts against a bottom surface of said bowl bottom to achieve said closed position.

3. The bowl of claim 2, wherein an outer edge of said strainer base comprises a grip thereon.

4. The bowl of claim 2, further comprising a plurality of gussets each disposed under said flange and attached thereto and an outer surface of said bowl body.

5. The bowl of claim 2, wherein said plurality of gussets are spaced at equidistant gaps.

6. The bowl of claim 2, wherein said second lip is disposed at an angle slightly less than ninety degrees.

7. The bowl of claim 2, further comprising a bead disposed along an inner circumference of said second lip.

8. The bowl of claim 2, further comprising a manufacture of molded, high density polyethylene.

9. A bowl, comprising:
   a bowl body, comprising a bowl sidewall and a bowl bottom defining an interior and further comprising:
      a first lip around an upper perimeter edge of said bowl body;
      a flange circumscribing an outer surface of said bowl subjacent to said lip, further having opposing ends extending outward to provide a pair of handles;
      an apron disposed along an outer circumference of said bowl bottom, comprising a groove on an inner surface thereof, said groove comprising a series of alternating flat portions and ramp portions;
      a strainer residing within said apron and in fluid communication with said bowl bottom, said strainer operably connected to said apron; and,
   a lid having a second lip removably attachable to said first lip;
   wherein said bowl bottom comprises a recessed portion having a circular cross-section depending downward from a bottom of said bowl sidewall, further comprising:
      a first plurality of sections each provided with a plurality of bowl apertures; and,
      a second plurality of sections;
      wherein individual sections of said first plurality of sections alternate with individual sections of said second plurality of sections;
   wherein said flange provides structural rigidity to said bowl body;
   wherein said strainer is movable between a closed position and an open position; and, wherein said open position enables collected liquids in a bottom of said bowl to drain away.

10. The bowl of claim 9, wherein said strainer further comprises:
- a strainer base, comprising a series of fingers formed on an interior vertical wall thereof said strainer base;
- a strainer base bottom, comprising a third plurality of sections each having a plurality of strainer apertures and a fourth plurality of sections; and,
- a plurality of stiffeners radially disposed on said strainer base bottom;
- wherein said series of fingers are in mechanical communication with said groove;
- wherein individual sections of said third plurality of sections alternate with individual sections of said fourth plurality of sections;
- wherein when said series of fingers are aligned with said flat portions, said plurality of strainer apertures of said first plurality of sections are in fluid communication with said plurality of bowl apertures of said third plurality of sections to achieve said open position; and,
- wherein when said series of fingers are fully aligned within said ramp portions, said second plurality of sections are aligned with said fourth plurality of sections and said strainer base bottom abuts against a bottom surface of said bowl bottom to achieve said closed position.

11. The bowl of claim 10, wherein an outer edge of said strainer base comprises a grip thereon.

12. The bowl of claim 10, further comprising a plurality of gussets each disposed under said flange and attached thereto and an outer surface of said bowl body.

13. The bowl of claim 10, wherein said plurality of gussets are spaced at equidistant gaps.

14. The bowl of claim 10, wherein said second lip is disposed at an angle slightly less than ninety degrees.

15. The bowl of claim 10, further comprising a bead disposed along an inner circumference of said second lip.

16. The bowl of claim 10, further comprising a manufacture of molded, high density polyethylene.

* * * * *